United States Patent
Zueski et al.

(10) Patent No.: US 11,415,209 B2
(45) Date of Patent: Aug. 16, 2022

(54) AXLE ASSEMBLY HAVING GEAR MECHANISMS

(71) Applicant: ArvinMeritor Technology, LLC, Troy, MI (US)

(72) Inventors: David Zueski, Northville, MI (US); Jeremy Cradit, Grand Blanc, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 363 days.

(21) Appl. No.: 16/583,946

(22) Filed: Sep. 26, 2019

(65) Prior Publication Data
US 2021/0095749 A1    Apr. 1, 2021

(51) Int. Cl.
*F16H 48/42* (2012.01)
*F16H 48/24* (2006.01)
*F16D 11/14* (2006.01)
*F16H 48/08* (2006.01)

(52) U.S. Cl.
CPC .............. *F16H 48/42* (2013.01); *F16D 11/14* (2013.01); *F16H 48/08* (2013.01); *F16H 48/24* (2013.01)

(58) Field of Classification Search
CPC ..................... F16H 48/24; F16H 48/42; F16H 3/091–0915; B60K 1/00–2001/001; F16D 11/14; F16D 2011/002
See application file for complete search history.

(56) References Cited

U.S. PATENT DOCUMENTS

| | | | |
|---|---|---|---|
| 2,152,771 A | | 4/1939 | Ormsby |
| 5,280,731 A | * | 1/1994 | Turpin ................. F16H 3/0915 192/48.7 |
| 9,566,857 B1 | * | 2/2017 | Pritchard ............... B60K 6/387 |
| 10,968,994 B2 | * | 4/2021 | Mittelberger .......... B60K 17/08 |
| 2011/0259657 A1 | | 10/2011 | Fuechtner |
| 2013/0072311 A1 | | 3/2013 | Smith et al. |
| 2019/0054816 A1 | | 2/2019 | Garcia et al. |
| 2019/0054817 A1 | | 2/2019 | Garcia et al. |
| 2019/0054818 A1 | | 2/2019 | Garcia et al. |

FOREIGN PATENT DOCUMENTS

| | | | |
|---|---|---|---|
| DE | 202005019438 U1 * | 4/2007 | ............... B60K 1/00 |
| DE | 102012213859 A1 | 2/2014 | |
| EP | 3530509 A1 | 8/2019 | |

OTHER PUBLICATIONS

Extended European Search Report dated Dec. 12, 2020 for related European Appln No. 20197311.2; 8 Pages.
Examination Report dated Dec. 13, 2021 for related European Appln No. 20197311.2; 4 Pages.

* cited by examiner

*Primary Examiner* — Ernesto A Suarez
*Assistant Examiner* — James J Taylor, II
(74) *Attorney, Agent, or Firm* — Brooks Kushman PC

(57) ABSTRACT

An axle assembly that includes a first gear mechanism, a second gear mechanism, and a differential assembly. The first gear mechanism and the differential assembly may be rotatable about a first axis. The second gear mechanism may be rotatable about a second axis. Torque may be transmitted between the first gear mechanism and the differential via the second gear mechanism.

20 Claims, 10 Drawing Sheets

AXLE ASSEMBLY HAVING GEAR MECHANISMS

TECHNICAL FIELD

This disclosure relates to an axle assembly that may include first and second gear mechanisms that facilitate torque transmission with a differential assembly.

BACKGROUND

An axle assembly having a differential assembly is disclosed in U.S. Patent Publication No. 2019/0054816.

SUMMARY

In at least one embodiment an axle assembly is provided. The axle assembly may include a first gear mechanism, a second gear mechanism, and a differential assembly. The first gear mechanism may include a ring gear and a first gear that are rotatable about a first axis. The second gear mechanism may have a second gear and a third gear that are rotatable about a second axis. The first gear may mesh with the second gear. The differential assembly may include a differential case and a fourth gear that are rotatable about the first axis. The third gear may mesh with the fourth gear. Torque may be transmitted between the first gear mechanism and the differential assembly via the second gear mechanism.

In at least one embodiment an axle assembly is provided. The axle assembly may include a drive pinion, a first gear mechanism, a second gear mechanism, and a differential assembly. The drive pinion may be rotatable about a drive pinion axis. The first gear mechanism may include a ring gear, a first gear, and a fifth gear that are rotatable about a first axis. The ring gear may mesh with the drive pinion and may receive torque from the drive pinion. The second gear mechanism may have a second gear, a third gear, and a sixth gear that are rotatable about a second axis. The first gear may mesh with the second gear and the fifth gear may mesh with the sixth gear. The differential assembly may include a differential case and a fourth gear that are rotatable about the first axis. The third gear may mesh with the fourth gear. Torque may be transmitted between the first gear mechanism and the second gear mechanism via either the first gear and the second gear or the fifth gear and the sixth gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
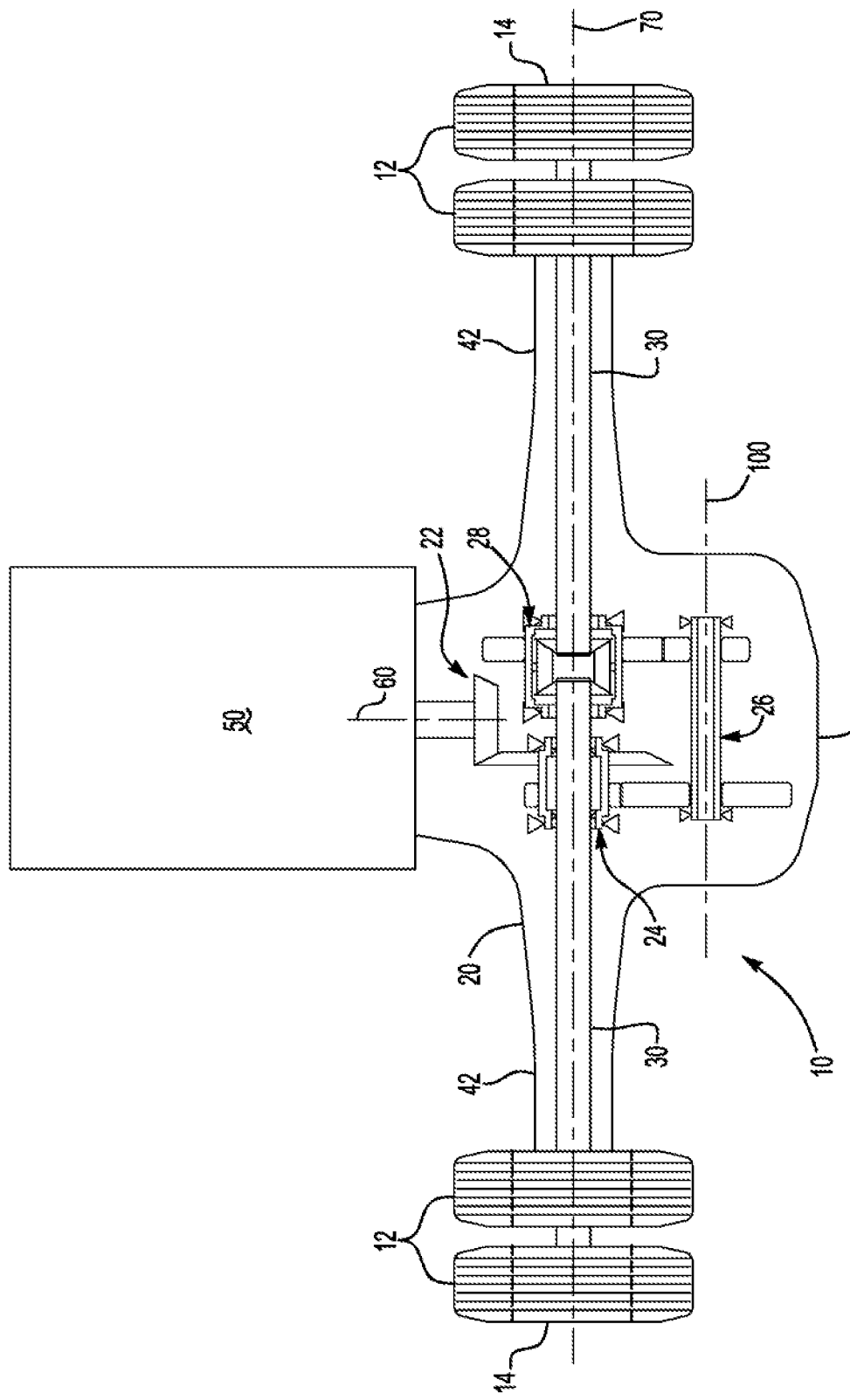
FIG. 1 is a plan view of a schematic representation of an axle assembly and a power source.

Referring to FIG. 1, an example of an axle assembly 10 is shown. The axle assembly 10 may be provided with a motor vehicle like a car, truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire 12 mounted on a wheel 14. One or more axle assemblies may be provided with the vehicle. In at least one configuration, the axle assembly 10 may include a housing assembly 20, a drive pinion 22, a first gear mechanism 24, a second gear mechanism 26, a differential assembly 28, and at least one axle shaft 30.

The housing assembly 20 may facilitate mounting of the axle assembly 10 to the vehicle. In addition, the housing assembly 20 may receive various components of the axle assembly 10. For example, the housing assembly 20 may receive and support the first gear mechanism 24, the second gear mechanism 26, the differential assembly 28, and optionally the axle shafts 30. In at least one configuration, the housing assembly 20 may include a center portion 40 and an arm portion 42.

The center portion 40 may be disposed proximate the center of the housing assembly 20. The center portion 40 may at least partially define a cavity that may receive the first gear mechanism 24, the second gear mechanism 26, the differential assembly 28, or combinations thereof. The center portion 40 may be made of one or more components and may include a removable cover that may facilitate access to internal components of the axle assembly, such as the first gear mechanism 24 and the second gear mechanism 26. A lower region of the center portion 40 may at least partially define a sump portion that may contain lubricant that may be splashed to lubricate internal components of the axle assembly 10, such as the first gear mechanism 24, the second gear mechanism 26, the differential assembly 28 and their associated bearings.

The center portion 40 may also facilitate mounting of various external components. For instance, the center portion 40 may facilitate mounting of a power source 50 to the housing assembly 20 or may facilitate mounting of one or more intermediate components that may be disposed between the power source 50 and the housing assembly 20, such as a differential carrier.

The power source 50 may provide torque to the axle assembly 10 and may have any suitable configuration. For instance, the power source 50 may be an engine such as an internal combustion engine that may be remotely positioned from the housing assembly 20 and may provide torque to the axle assembly 10 via intermediate components such as a transmission and a drive shaft. As another example, the power source 50 may be an electric motor that may be remotely positioned from the housing assembly 20 or may be directly mounted to the housing assembly 20 or disposed adjacent to the housing assembly 20 as shown in FIG. 1.

One or more arm portions 42 may extend from the center portion 40. For example, two arm portions 42 may extend in opposite directions from the center portion 40 and away from the differential assembly 28. The arm portions 42 may have substantially similar configurations. For example, the arm portions 42 may each have a hollow configuration or tubular configuration that may extend around the corresponding axle shaft 30 and may help separate or isolate the axle shaft 30 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 30. It is also contemplated that the arm portions 42 may be omitted.

The drive pinion 22 may be at least partially received in the housing assembly 20. The drive pinion 22 may be operatively connected to the power source 50. As such, the drive pinion 22 may help operatively connect the power source 50 to components of the axle assembly 10, such as the first gear mechanism 24. The drive pinion 22 may extend along and may be rotatable about a drive pinion axis 60. The drive pinion 22 may be directly connected or indirectly connected to the power source 50. In the configuration shown in FIG. 1, the drive pinion 22 may be provided with or may be directly coupled to an output of the power source 50, such as an output shaft of an electric motor. In such a configuration, the drive pinion 22 may extend from the power source 50. The drive pinion 22 may also be indirectly coupled to an output of the power source 50, such as via an intervening planetary gear set as will be discussed in more detail below. In at least one configuration such as is shown in FIG. 2, the drive pinion 22 may include a gear portion 62 and optionally a shaft portion 64.

The gear portion 62 may be disposed at or near an end of the drive pinion 22. The gear portion 62 may have a plurality of teeth that may mate or mesh with corresponding teeth on a ring gear of the first gear mechanism 24 as will be discussed in more detail below. As such, the drive pinion 22 may provide torque from the power source 50 to the ring gear of the first gear mechanism 24.

The shaft portion 64, if provided, may be operatively connected to the power source 50. The shaft portion 64 may extend from the gear portion 62 in a direction that may extend toward the power source 50. The shaft portion 64 may be integrally formed with the gear portion 62 or may be provided as a separate component that may be fixedly coupled to the gear portion 62.

Figure 2:
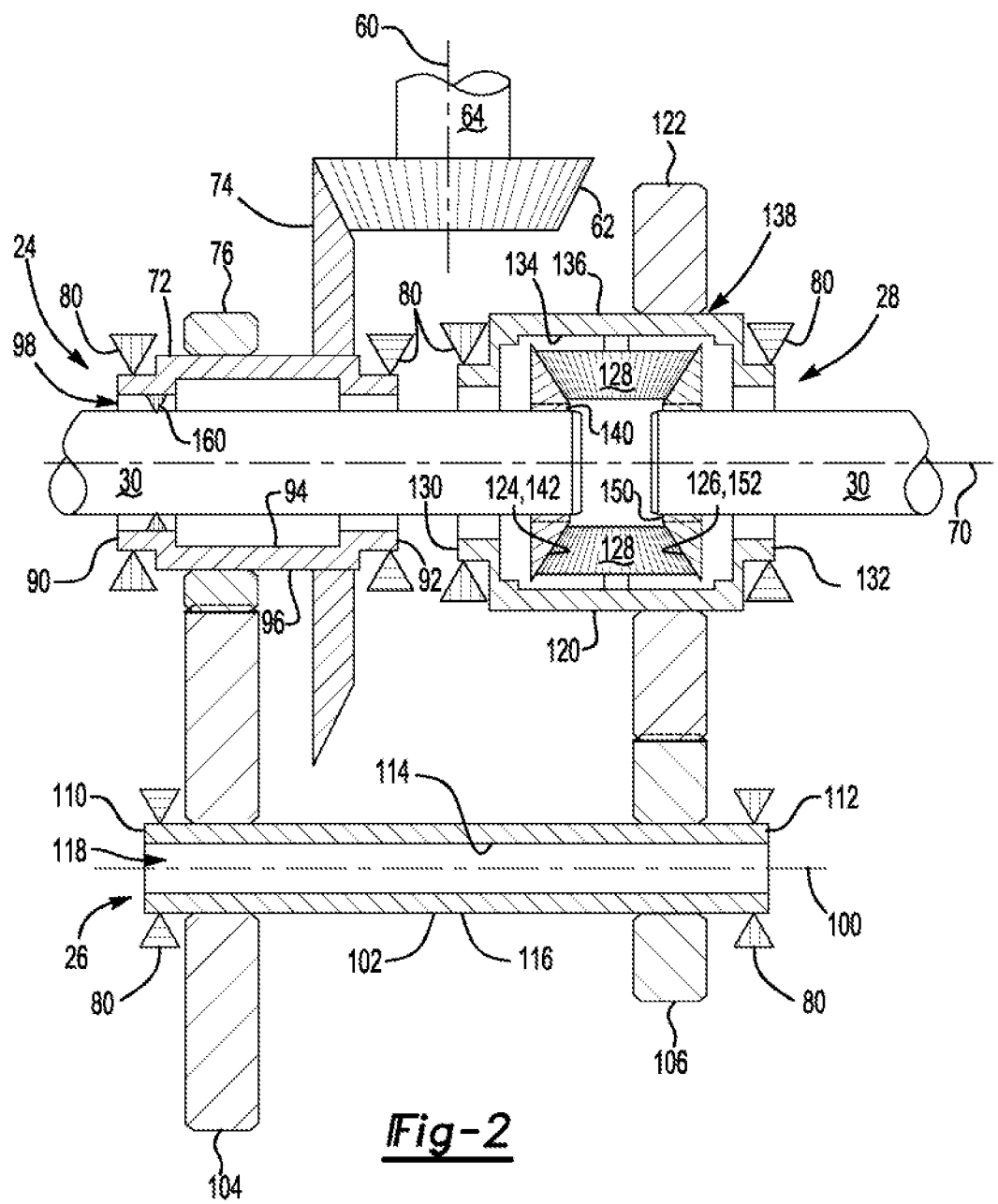
FIG. 2 is a magnified section view of a portion of the axle assembly of FIG. 1 with a housing assembly of the axle assembly omitted for clarity.

Referring to FIGS. 1 and 2, the first gear mechanism 24 may be at least partially received in the housing assembly 20. The first gear mechanism 24 may be rotatable about a first axis 70. The first axis 70 may be disposed substantially perpendicular to the drive pinion axis 60 in one or more embodiments. The first gear mechanism 24 may be spaced apart from the differential assembly 28. In at least one configuration, the first gear mechanism 24 may include a first shaft 72, a ring gear 74, and a first gear 76.

Referring to FIG. 2, the first shaft 72 may be rotatable about the first axis 70. For example, the first shaft 72 may be rotatably supported on the housing assembly 20 by one or more roller bearing assemblies 80. In the configuration shown in FIG. 2, a roller bearing assembly 80 is located near opposing first and second ends the first shaft 72. The roller bearing assembly 80 may have any suitable configuration.

For instance, the roller bearing assembly 80 may include a plurality of rolling elements that may be disposed between an inner race and an outer race. The inner race may be mounted to the first shaft 72 and may extend around and may receive the first shall 72. The outer race may extend around the inner race and may be mounted to the housing assembly 20.

The first shaft 72 may support the ring gear 74 and the first gear 76. In addition, the first shaft 72 may have a hollow tubular configuration that may include a first end 90, a second end 92, an inner side 94, and an outer side 96.

The first end 90 and the second end 92 may be disposed opposite each other and may be disposed at opposite ends of the first shaft 72. In at least one configuration, the first end 90 may face away from the differential assembly 28 while the second end 92 may face toward the differential assembly 28; however, it is contemplated that such positioning may be reversed.

The inner side 94 may face toward and may extend around the first axis 70. The inner side 94 may at least partially define a hole 98 that may extend through the first shaft 72. The hole 98 may extend from the first end 90 to the second end 92.

The outer side 96 may be disposed opposite the inner side 94. As such, the outer side 96 may face away from the first axis 70. The ring gear 74 and the first gear 76 may be supported by the outer side 96.

The ring gear 74 may be fixedly disposed on the first shaft 72 or fixedly mounted to the first shaft 72. As such, the ring gear 74 may rotate about the first axis 70 with the first shaft 72. For example, the ring gear 74 may receive the first shaft 72 and may be fixedly disposed on the outer side 96 of the first shaft 72. The ring gear 74 may extend around the first axis 70 and may have a plurality of teeth that may be arranged around the first axis 70 that may contact and mate or mesh with teeth of the gear portion 62 of the drive pinion 22. Accordingly, torque may be transmitted between the power source 50 and the ring gear 74 via the drive pinion 22. In at least one configuration, the ring gear 74 may be axially positioned along the first axis 70 between the first end 90 and the second end 92 of the first shaft 72, may be axially positioned between the roller bearing assemblies 80 that support the first shaft 72, or both. In the configuration shown in FIG. 2, the ring gear 74 is spaced apart from the differential assembly 28 and is positioned closer to the differential assembly 28 than the first gear 76; however, it is contemplated that the positioning of the ring gear 74 and the first gear 76 may be changed or reversed.

The first gear 76 may be fixedly disposed on the first shaft 72 or fixedly mounted to the first shaft 72. As such, the first gear 76 may rotate about the first axis 70 with the first shaft 72 and the ring gear 74. For example, the first gear 76 may receive the first shaft 72 and may be fixedly disposed on the outer side 96 of the first shaft 72. The first gear 76 may extend around the first axis 70 and may have a plurality of teeth that may be arranged around and may face away from the first axis 70. The teeth of the first gear 76 may contact and mate or mesh with teeth of a second gear that may be provided with the second gear mechanism 26 as will be discussed in more detail below. In at least one configuration, the first gear 76 may be axially positioned along the first axis 70 between the first end 90 and the second end 92 of the first shaft 72, may be axially positioned between the roller bearing assemblies 80 that support the first shaft 72, or both. In the configuration shown in FIG. 2, the first gear 76 is axially positioned between the first end 90 and the ring gear 74.

Referring to FIGS. 1 and 2, the second gear mechanism 26 may be at least partially received in the housing assembly 20. The second gear mechanism 26 may be rotatable about a second axis 100. The second axis 100 may be disposed parallel or substantially parallel to the first axis 70. In addition, the second axis 100 may be disposed further from the power source 50 and the drive pinion 22 than the first axis 70. In at least one configuration, second gear mechanism 26 may include a second shaft 102, a second gear 104, and a third gear 106.

Referring to FIG. 2, the second shaft 102 may be rotatable about the second axis 100. For example, the second shaft 102 may be rotatably supported on the housing assembly 20 by one or more roller bearing assemblies 80. The inner race of a roller bearing assembly 80 may be mounted to the second shaft 102 and may extend around and may receive the second shaft 102. The outer race may extend around the inner race and may be mounted to the housing assembly 20. The second shaft 102 may be a solid shaft or a hollow shaft. The second shaft 102 may support the second gear 104 and the third gear 106. In addition, the second shaft 102 may include a first end 110, a second end 112, an inner side 114, and an outer side 116.

The first end 110 and the second end 112 may be disposed opposite each other and may be disposed at opposite ends of the second shaft 102. In at least one configuration, the first end 110 may be disposed further from the differential assembly 28 than the second end 112.

The inner side 114 may face toward and may extend around the second axis 100. The inner side 114 may at least partially define a hole 118 that may extend through the second shaft 102. The hole 118 may extend from the first end 110 to the second end 112. The inner side 114 and hole 118 are optional and may be omitted if the second shaft 102 has a solid configuration.

The outer side 116 may be disposed opposite the inner side 114. As such, the outer side 116 may face away from the second axis 100. The second gear 104 and the third gear 106 may be supported by the outer side 116.

The second gear 104 may be fixedly disposed on the second shaft 102 or fixedly mounted to the second shaft 102. As such, the second gear 104 may rotate about the second axis 100 with the second shaft 102. For example, the second gear 104 may receive the second shaft 102 and may be fixedly disposed on the outer side 116 of the second shaft 102. The second gear 104 may extend around the second axis 100 and may have a plurality of teeth that may be arranged around the second axis 100 that may contact and mate or mesh with teeth of the first gear 76. The first gear 76 may have a smaller diameter than the second gear 104. In at least one configuration, the second gear 104 may be axially positioned along the second axis 100 between the first end 110 and the second end 112 of the second shaft 102, may be axially positioned between the roller bearing assemblies 80 that support the second shaft 102, or both. In the configuration shown in FIG. 2, the second gear 104 is spaced apart from the differential assembly 28 and is positioned closer to the first end 110 of the second shaft 102 than the second end 112.

The third gear 106 may be fixedly disposed on the second shaft 102 or fixedly mounted to the second shaft 102. As such, the third gear 106 may rotate about the second axis 100 with the second shaft 102 and the second gear 104. For example, the third gear 106 may receive the second shaft 102 and may be fixedly disposed on the outer side 116 of the second shaft 102. The third gear 106 may extend around the second axis 100 and may have a plurality of teeth that may be arranged around and may face away from the second axis 100. The teeth of the third gear 106 may contact and mate or mesh with teeth of a fourth gear that may be provided with the differential assembly 28 as will be discussed in more detail below. The third gear 106 may have a smaller diameter than the first gear 76 and the second gear 104. In at least one configuration, the third gear 106 may be axially positioned along the second axis 100 between the first end 110 and the second end 112 of the second shaft 102, may be axially positioned between the roller bearing assemblies 80 that rotatably support the second shaft 102, or both. In the configuration shown in FIG. 2, the third gear 106 is axially positioned between the second gear 104 and the second end 112 of the second shaft 102. In addition, the third gear 106 may be aligned with and may be disposed substantially parallel to the second gear 104.

Referring to FIGS. 1 and 2, the differential assembly 28 may be at least partially received in the center portion 40 of the housing assembly 20. The differential assembly 28 may transmit torque to the vehicle traction wheel assemblies and permit the traction wheel assemblies to rotate at different velocities. For example, the differential assembly 28 may be operatively connected to the axle shafts 30 and may permit the axle shafts 30 to rotate at different rotational speeds about the first axis 70. Moreover, the first gear mechanism 24 and the differential assembly 28 may be rotatable about the first axis 70 at different speeds. In at least one embodiment, the differential assembly 28 may include a differential case 120, a fourth gear 122, a first differential gear 124, a second differential gear 126, and at least one pinion gear 128.

The differential case 120 may be configured to receive components of the differential assembly 28. In addition, the differential case 120 may be rotatable about the first axis 70. For example, the differential case 120 may be rotatably supported by a pair of roller bearing assemblies 80. The differential case 120 may at least partially define a cavity that may at least partially receive the first differential gear 124, second differential gear 126, and pinion gear(s) 128. In at least one configuration, the differential case 120 may include a first case end 130, a second case end 132, an inner case side 134, and an outer case side 136.

The first case end 130 and the second case end 132 may be disposed opposite each other and at opposite ends of the differential case 120. In at least one configuration, the first case end 130 may face toward the first gear mechanism 24 while the second case end 132 may face away from the first gear mechanism 24.

The inner case side 134 may face toward and may extend around the first axis 70. The inner case side 134 may at least partially define a case cavity 138 that may at least partially receive the first differential gear 124, second differential gear 126, and pinion gear(s) 128. In at least one configuration, the case cavity 138 may extend from the first case end 130 to the second case end 132 and may partially receive the axle shafts 30.

The outer case side 136 may be disposed opposite the inner case side 134. As such, the outer case side 136 may face away from the first axis 70.

The fourth gear 122 may be fixedly disposed on the differential case 120 or fixedly mounted to the differential case 120. As such, the fourth gear 122 may rotate about the first axis 70 with the differential case 120. For example, the fourth gear 122 may receive the differential case 120 and may be fixedly disposed on the outer case side 136 of the differential case 120. The fourth gear 122 may extend around the first axis 70 and may have a plurality of teeth that may be arranged around and may face away from the first axis 70. The teeth of the fourth gear 122 may contact and mate or mesh with teeth of a third gear 106. As such, torque may be transmitted between the first gear mechanism 24 and the differential assembly 28 via the second gear mechanism 26. The fourth gear 122 may have a larger diameter than the first gear 76, second gear 104, and the third gear 106. As such, the first gear 76 and second gear 104 may provide a different gear ratio than the third gear 106 and the fourth gear 122. For instance, the first gear 76 and second gear 104 may provide a smaller gear ratio than the third gear 106 and the fourth gear 122. As a nonlimiting example, the first gear 76 and second gear 104 may provide a gear ratio of 2.0 while the third gear 106 and the fourth gear 122 may provide a gear ratio of 2.22. In at least one configuration, the fourth gear 122 may be axially positioned along the first axis 70 between the first case end 130 and the second case end 132 of the differential case 120, may be axially positioned between the roller bearing assemblies 80 that rotatably support the differential case 120, or both. The fourth gear 122 may be aligned with and may be disposed substantially parallel to the third gear 106.

The first differential gear 124 may be disposed in the differential case 120. For example, the first differential gear 124 may be at least partially disposed in the case cavity 138 and may be configured to rotate about the first axis 70. In at least one configuration, the first differential gear 124 may include a first differential gear hole 140 and a gear portion 142.

The first differential gear hole 140 may be disposed along the first axis 70. The first differential gear hole 140 may be configured to receive a first axle shaft 30. The first differential gear 124 may rotate with the first axle shaft 30. For example, the first differential gear hole 140 may have a spline that may mate or mesh with a corresponding spline on the first axle shaft 30 to inhibit or prevent rotation of the first differential gear 124 with respect to the first axle shaft 30.

The gear portion 142 may have a set of teeth that may be arranged around the first axis 70 and that may mate or mesh with teeth on one or more pinion gears 128.

The second differential gear 126 may be disposed in the differential case 120. For example, the second differential gear 126 may be at least partially disposed in the case cavity 138 and may be configured to rotate about the first axis 70. The second differential gear 126 may be spaced apart from the first differential gear 124 and may have a similar or identical configuration as the first differential gear 124. In at least one embodiment, the second differential gear 126 may include a second differential gear hole 150 and a gear portion 152.

The second differential gear hole 150 may be disposed along the first axis 70. The second differential gear hole 150 may be configured to receive a second axle shaft 30. In at least one embodiment, the second differential gear 126 may rotate with the second axle shaft 30. For example, the second differential gear hole 150 may have a spline that may mate or mesh with a corresponding spline on the second axle shaft 30 to inhibit or prevent rotation of the second differential gear 126 with respect to the second axle shaft 30.

The gear portion 152 may face toward the gear portion 142 of the first differential gear 124. The gear portion 152 may have a set of teeth that may be arranged around the first axis 70 and that may mate or mesh with teeth on one or more pinion gears 128.

At least one pinion gear 128 may be received in the case cavity 138. A pinion gear 128 may include a set of teeth that mate or mesh with teeth on the first differential gear 124 and teeth on the second differential gear 126. In addition, a pinion gear 128 may be rotatable with respect to the differential case 120 or rotatably mounted on the differential case 120. For instance, each pinion gear 128 may receive and may be rotatable about a shaft or a spider that may extend from or may be mounted to the differential case 120.

Referring to FIGS. 1 and 2, the axle shafts 30 may transmit torque from the differential assembly 28 to corresponding traction wheel assemblies. For example, two axle shafts 30 may be provided such that each axle shaft 30 extends through a different arm portion 42 of housing assembly 20. The axle shafts 30 may extend along and may be rotatable about the first axis 70. Each axle shaft 30 may have a first end and a second end. The first end may be operatively connected to the differential assembly 28. The second end may be disposed opposite the first end and may be operatively connected to a corresponding wheel end assembly that may have a wheel hub that may support a wheel 14. Optionally, gear reduction may be provided between an axle shaft and a wheel 14. In at least one configuration, an axle shaft 30 may extend through the hole 98 in the first shaft 72.

Optionally, a roller bearing assembly 160 may be provided to rotatably support an axle shaft 30 that may extend through the first shaft 72. The roller bearing assembly 160 may have any suitable configuration. For instance, the roller bearing assembly 160 may include a plurality of rolling elements that may be disposed between an inner race and an outer race. The inner race may be mounted to the axle shaft 30 and may extend around and may receive the axle shaft 30. The outer race may extend around the inner race and may be received in the hole 98 of the first shaft 72 and may be mounted to the inner side 94 of the first shaft 72.

Figure 3:
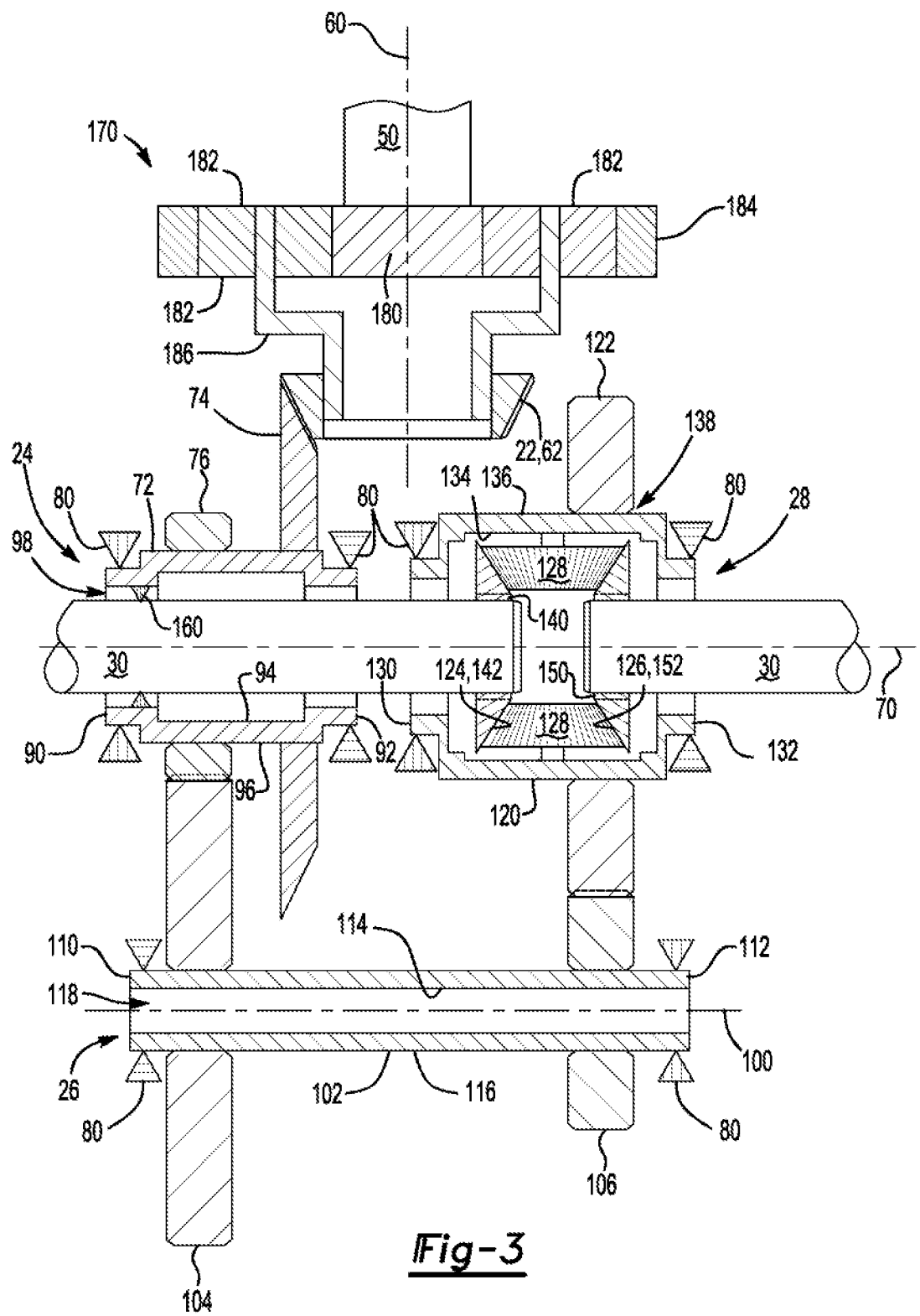
FIG. 3 adds a planetary gear set to the axle assembly of FIG. 2.

Referring to FIG. 3, another axle assembly configuration is shown. This configuration is the same as that shown in FIG. 2 but also includes a planetary gear set 170 that is disposed between the power source 50 and the first gear mechanism 24. The planetary gear set 170 may provide gear reduction between the power source 50 in the first gear mechanism 24. In at least one configuration, the planetary gear set 170 may include a sun gear 180, at least one planet gear 182, a planetary ring gear 184, and a planet gear carrier 186.

The sun gear 180 may be disposed proximate the center of the planetary gear set 170 and may be rotatable about the drive pinion axis 60. The sun gear 180 may be mounted to a shaft of the power source 50 or a shaft that may be operatively connected to the power source 50. The sun gear 180 may include a set of teeth that may extend away from the drive pinion axis 60 and that may mesh with teeth of the planet gears 182.

One or more planet gears 182 may be rotatably disposed between the sun gear 180 and the planetary ring gear 184. Each planet gear 182 may have a hole and a set of teeth that may be disposed opposite the hole. The set of teeth of a planet gear 182 may mesh with the teeth of the sun gear 180 and teeth on the planetary ring gear 184. Each planet gear 182 may be configured to rotate about a different planet pinion axis. The planet pinion axes may extend substantially parallel to the drive pinion axis 60.

The planetary ring gear 184 may extend around the drive pinion axis 60 and may receive the planet gears 182. The planetary ring gear 184 may include a plurality of teeth that may extend toward the drive pinion axis 60 and may mesh with teeth on the planet gears 182. The planetary ring gear 184 may be fixedly positioned with respect to the housing assembly 20 and the drive pinion axis 60.

The planet gear carrier 186 may be rotatable about the drive pinion axis 60 and may rotatably support the planet gears 182. In at least one configuration, the planet gear carrier 186 may be coupled to the drive pinion 22 or may be received by the gear portion 62 of the drive pinion 22. As such, the drive pinion 22 may extend from the planetary gear set 170.

Figure 4:
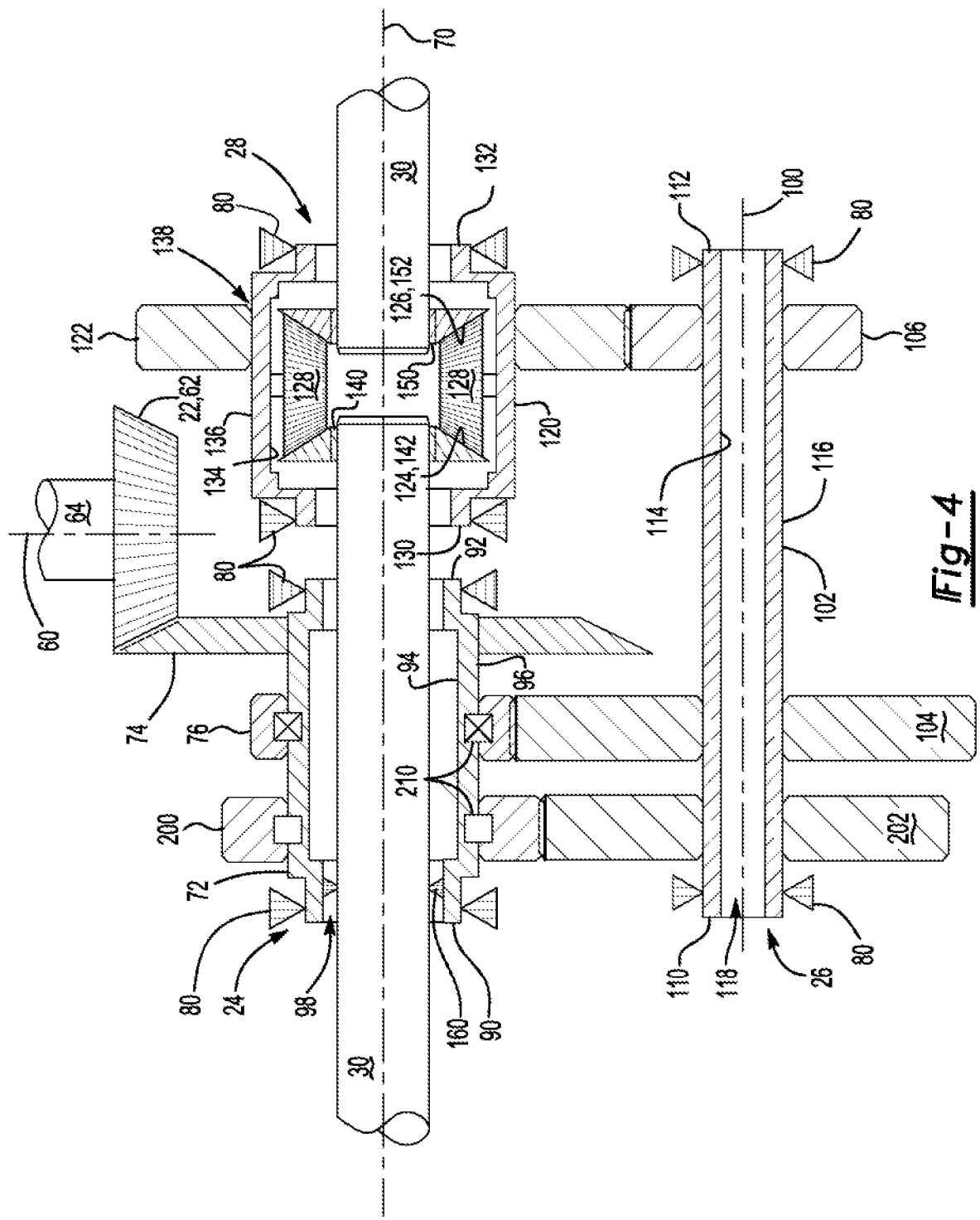
FIGS. 4-7 show examples of multi-speed configurations of an axle assembly.
Figure 5:
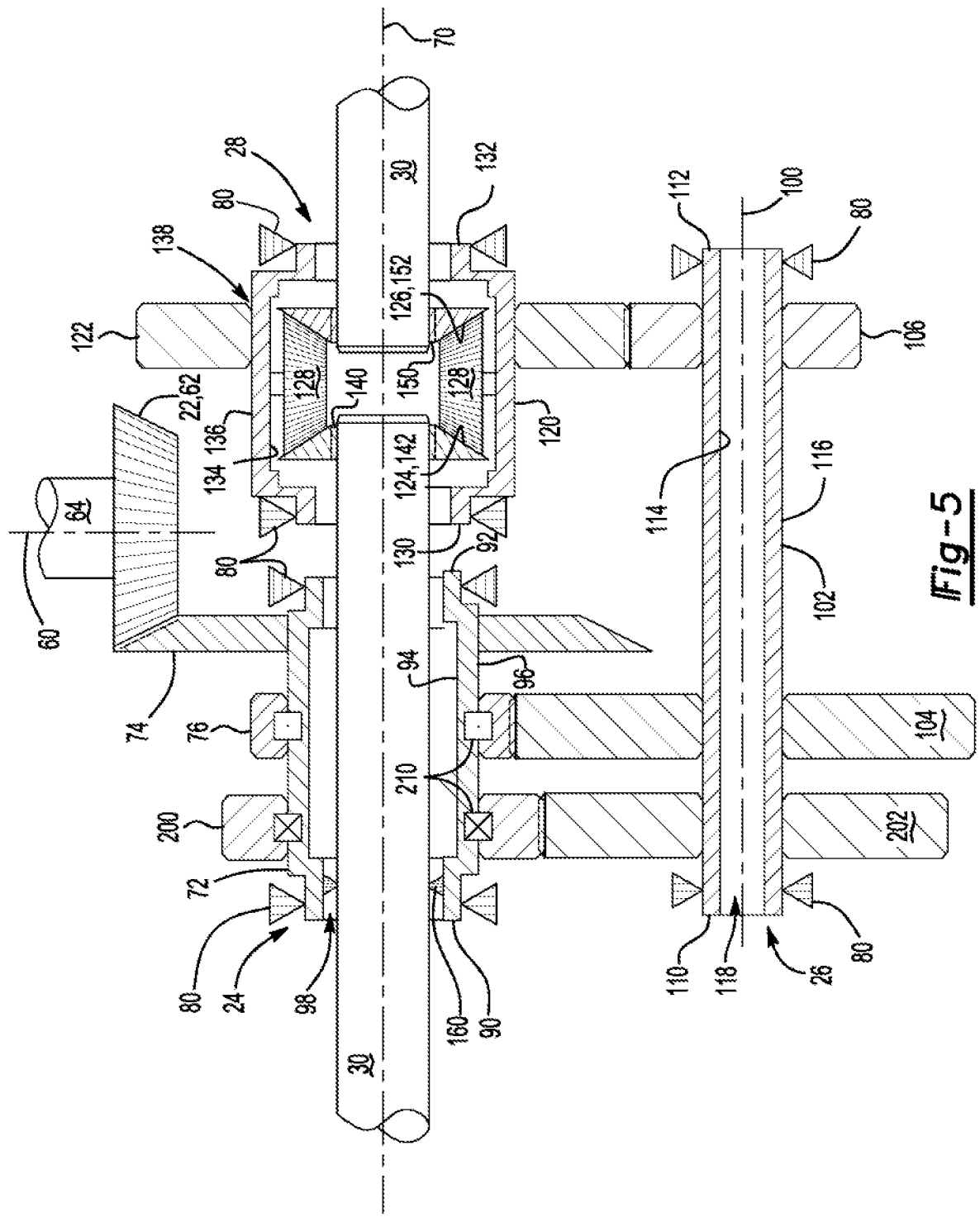

Referring to FIGS. 4 and 5, a multispeed axle assembly configuration is shown. This configuration is similar to the configuration shown in FIG. 2, however the first gear mechanism 24 and the second gear mechanism 26 may include at least one additional gear. For example, the first gear mechanism 24 may additionally include a fifth gear 200 and the second gear mechanism 26 may additionally include a sixth gear 202. In addition, one or more clutches may be provided that may selectively couple one or more gears of the first gear mechanism 24 to the first shaft 72, selectively couple one or more gears of the second gear mechanism 26 to the second shaft 102, or combinations thereof.

The fifth gear 200 may receive the first shaft 72. The fifth gear 200 may extend around the first axis 70 and may have a plurality of teeth that may be arranged around and may face away from the first axis 70. The teeth of the fifth gear 200 may contact and may mate or mesh with teeth of the sixth gear 202. In at least one configuration, the fifth gear 200 may be axially positioned along the first axis 70 between the first end 90 and the second end 92 of the first shaft 72, may be axially positioned between the roller bearing assemblies 80 that support the first shaft 72, or both. In the configuration shown in FIGS. 4 and 5, the fifth gear 200 is axially positioned between the first end 90 and the first gear 76; however, it is contemplated that the positioning of the fifth gear 200 and the sixth gear 202 and the positioning of the first gear 76 and the second gear 104 may be reversed or provided in different configurations. The fifth gear 200 may have a larger diameter than the first gear 76.

The sixth gear 202 may receive the second shaft 102. The sixth gear 202 may extend around the second axis 100 and may have a plurality of teeth that may be arranged around and may face away from the second axis 100. In at least one configuration, the sixth gear 202 may be axially positioned along the second axis 100 between the first end 110 and the second end 112 of the second shaft 102, may be axially positioned between the roller bearing assemblies 80 that support the second shaft 102, or both. In the configuration shown in FIGS. 4 and 5, the sixth gear 202 is axially positioned between the first end 110 and the second gear 104; however, it is contemplated that the positioning of the sixth gear 202 may be changed or reversed with the position of the second gear 104.

The sixth gear 202 may have a larger diameter than the first gear 76, the third gear 106, and the fifth gear 200. The fifth gear 200 and the sixth gear 202 may also have a smaller diameter than the second gear 104. As such, the fifth gear 200 and the sixth gear 202 may provide a different gear ratio than the first gear 76 and the second gear 104 and may provide a different gear ratio than the third gear 106 and the fourth gear 122. For instance, the fifth gear 200 and the sixth gear 202 may provide a smaller gear ratio than the first gear 76 and the second gear 104 and a smaller gear ratio than the third gear 106 and the fourth gear 122. As a nonlimiting example, the first gear 76 and second gear 104 may provide a gear ratio of 2.0, the third gear 106 and the fourth gear 122 may provide a gear ratio of 2.22, and the fifth gear 200 and the sixth gear 202 may provide a gear ratio of 1.28.

It is also contemplated that other gear configurations may be provided. As one example, the first gear 76 may have a smaller diameter than the second gear 104 and the third gear 106. As another example, an "overdrive" configuration may be provided in which the fifth gear 200 and the sixth gear 202 provide an overdrive gear ratio of less than 1:1, the first gear 76 has a larger diameter than the second gear 104, or both. As another example, one or more meshing gears may have equal diameters or may provide a 1:1 gear ratio. As such, gear ratios may be provided that are greater than 1:1, less than 1:1 or equal (i.e., 1:1).

The teeth of the gears may be of any suitable type. As a non-limiting example, the meshing teeth of the first gear 76 and second gear 104, third gear 106 and fourth gear 122, and fifth gear 200 and sixth gear 202 may have a helical configuration while the meshing teeth of the ring gear 74 and gear portion 62 may have a spiral bevel configuration such as a hypoid configuration.

As an overview of the configurations shown in FIGS. 4-7, torque may be transmitted between the first gear mechanism 24 and the second gear mechanism 26 via the first gear 76 and the second gear 104 when the first gear 76 and the second gear 104 are coupled to rotate with the first shaft 72 and second shaft 102, respectively, or via the fifth gear 200 and the sixth gear 202 when the fifth gear 200 and the sixth gear 202 are coupled to rotate with the first shaft 72 and second shaft 102, respectively. It is contemplated that additional gear pairings may be provided, such as by providing a seventh gear with the first gear mechanism that meshes with an eighth gear of the second gear mechanism and so on. Regardless of whether additional gear pairings are provided, the gear pairings of the first gear mechanism 24 and the second gear mechanism 26 may provide multiple gear ratios for transmitting torque between the first gear mechanism 24 and the second gear mechanism 26, and hence multiple gear ratios for transmitting torque between the power source 50 and the differential assembly 28.

A gear pairing may be selected by coupling the gears of a pairing to their corresponding shafts while decoupling at least one gear of other gear pairings from their corresponding shafts. Such coupling may be accomplished with one or more clutches 210. More specifically, one or more clutches 210 may be provided to selectively couple gears to the first shaft 72, the second shaft 102, or combinations thereof. A clutch 210 may couple at least one gear to a corresponding shaft so the shaft and gear or gears may be rotatable together about a corresponding axis.

In FIGS. 4-7, coupling of a gear to a corresponding shaft with a clutch 210 is represented by an "X" in a square box that is located between the gear and the corresponding shaft. In FIGS. 4-7, a gear that is decoupled from a corresponding shaft is represented by omitting an "X" from the square box that is located between the gear and the corresponding shaft. A clutch 210 may have any suitable configuration. For instance, the clutch 210 may be configured as a disc clutch that may include friction discs that may be selectively engaged to couple a gear to a corresponding shaft. Alternatively, the clutch 210 may be configured as a dog clutch or clutch collar that may receive, rotate with, and slide along a corresponding shaft to selectively couple and decouple one or more gears to the shaft.

Figure 6:
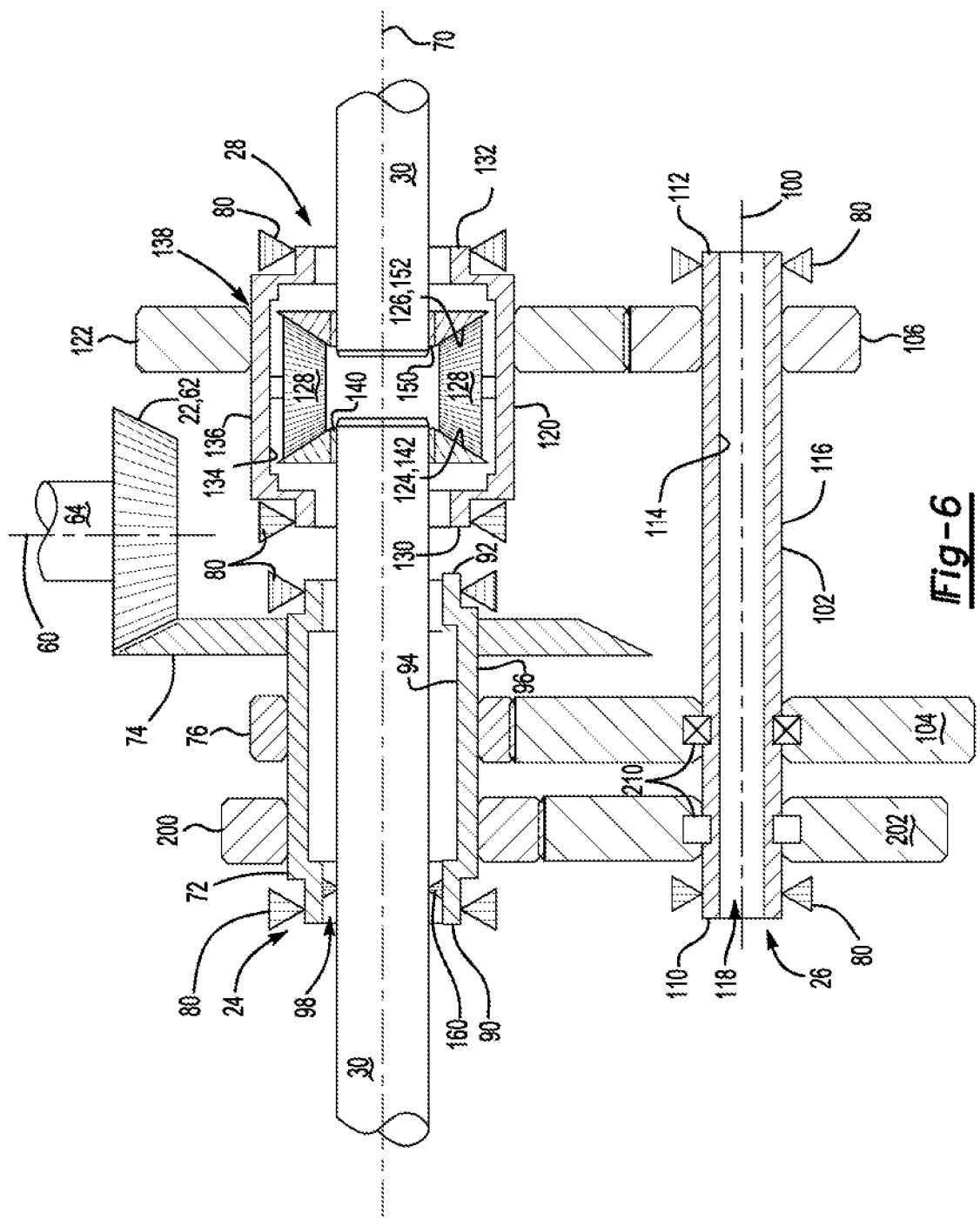
Figure 7:
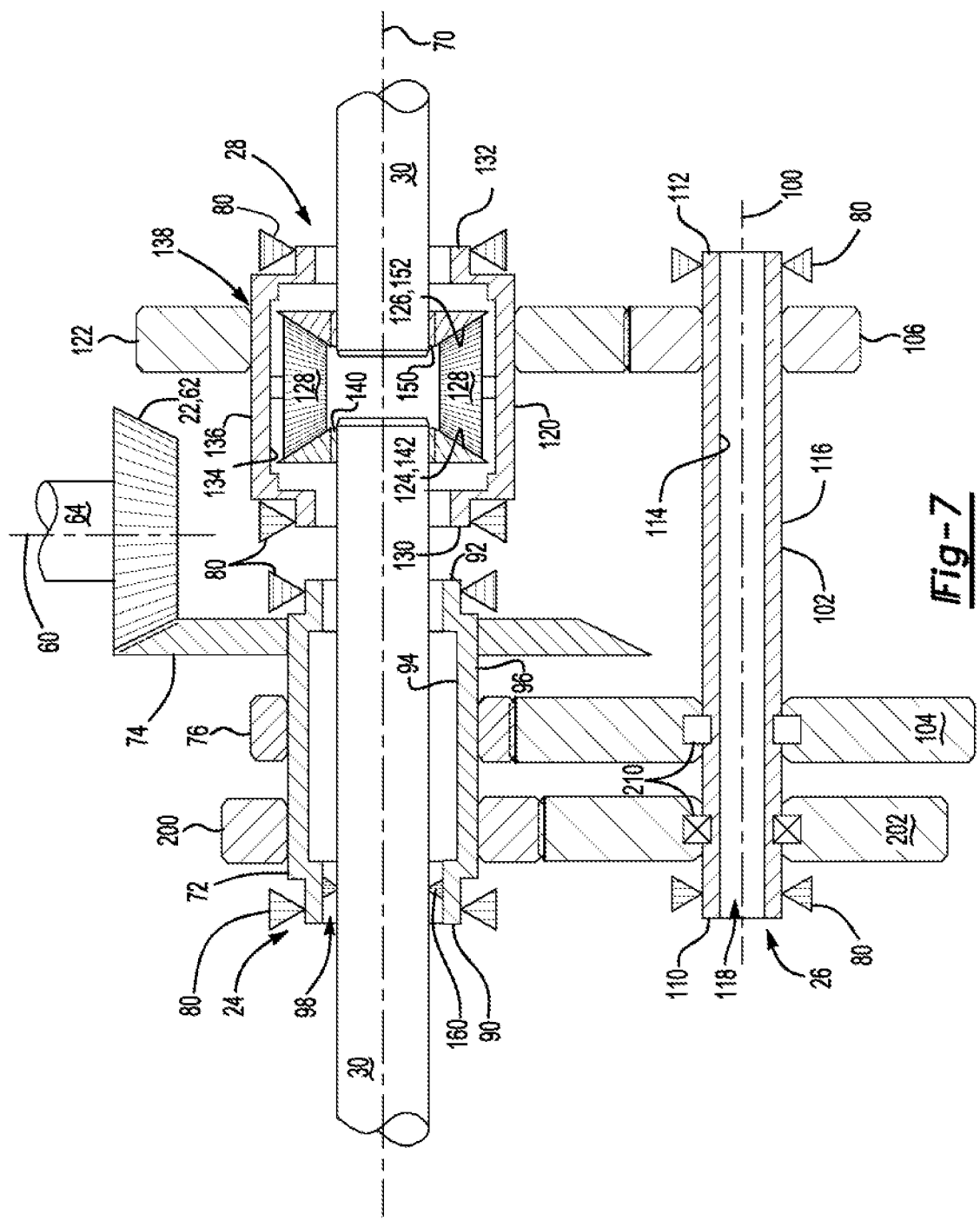

A clutch or clutches 210 may be provided in various locations. For example, one or more clutches may be provided with the first gear mechanism 24, the second gear mechanism 26, or combinations thereof. In FIGS. 4 and 5, one or more clutches 210 may be provided with the first gear mechanism 24. In FIGS. 6 and 7, one or more clutches 210 may be provided with the second gear mechanism 26.

Referring FIGS. 4 and 5, one or more clutches 210 are associated with the first shaft 72. The second gear 104 and the sixth gear 202 may be fixedly disposed on the second shaft 102.

In FIG. 4, one or more clutches 210 may be provided to couple the first gear 76 to the first shaft 72 such that the first gear 76 is rotatable about the first axis 70 with the first shaft 72 while the fifth gear 200 is decoupled from the first shaft 72 such that the first shaft 72 is rotatable about the first axis 70 with respect to the fifth gear 200. As such, torque is transmitted from the first gear mechanism 24 to the second gear mechanism 26 via the first gear 76 and the second gear 104 rather than via the fifth gear 200 and the sixth gear 202.

In FIG. 5, one or more clutches may be provided to couple the fifth gear 200 to the first shaft 72 such that the fifth gear 200 is rotatable about the first axis 70 with the first shaft 72 while the first gear 76 is decoupled from the first shaft 72 such that the first shaft 72 is rotatable about the first axis 70 with respect to the first gear 76. As such, torque is transmitted from the first gear mechanism 24 to the second gear mechanism 26 via the fifth gear 200 and the sixth gear 202 rather than via the first gear 76 and the second gear 104.

A clutch 210 may selectively couple a single gear to the first shaft 72. For instance, one clutch may be provided to selectively couple the first gear 76 to the first shaft 72 while another clutch may be provided to selectively couple the fifth gear 200 to the first shaft 72. In a configuration like that shown in FIGS. 4 and 5, such clutches may be configured to operate or may be controlled such that the first gear 76 and the fifth gear 200 are not simultaneously coupled or locked to rotate with the first shaft 72.

Figure 8:
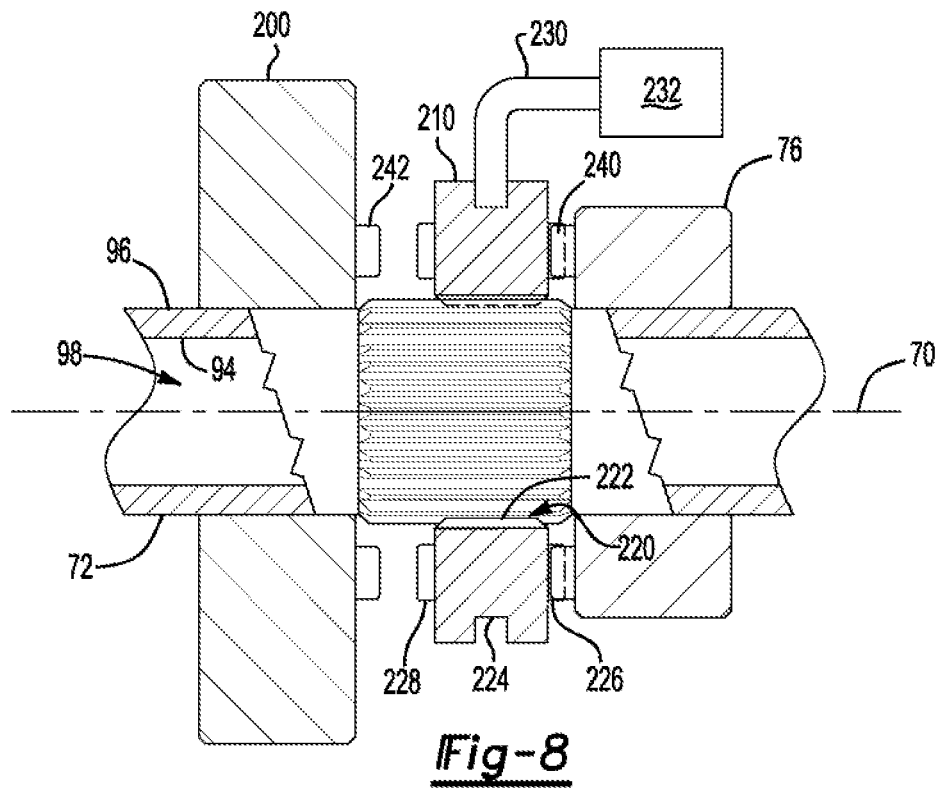
FIGS. 8 and 9 show an example of a clutch that may be provided with an axle assembly to selectively couple a gear to a shaft.
Figure 9:
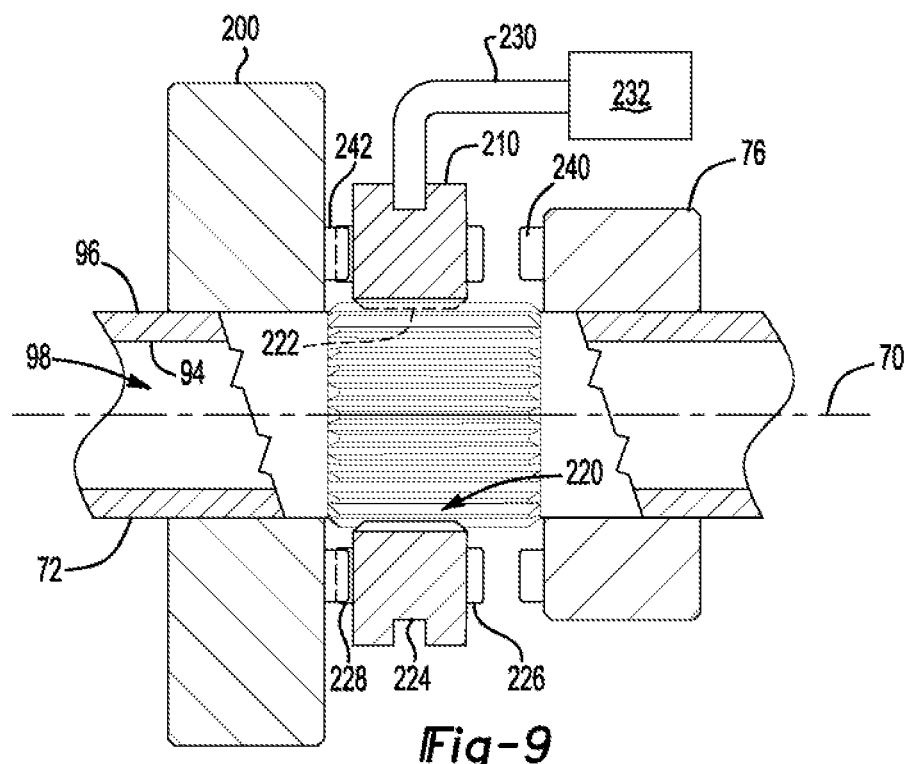
Figure 10:
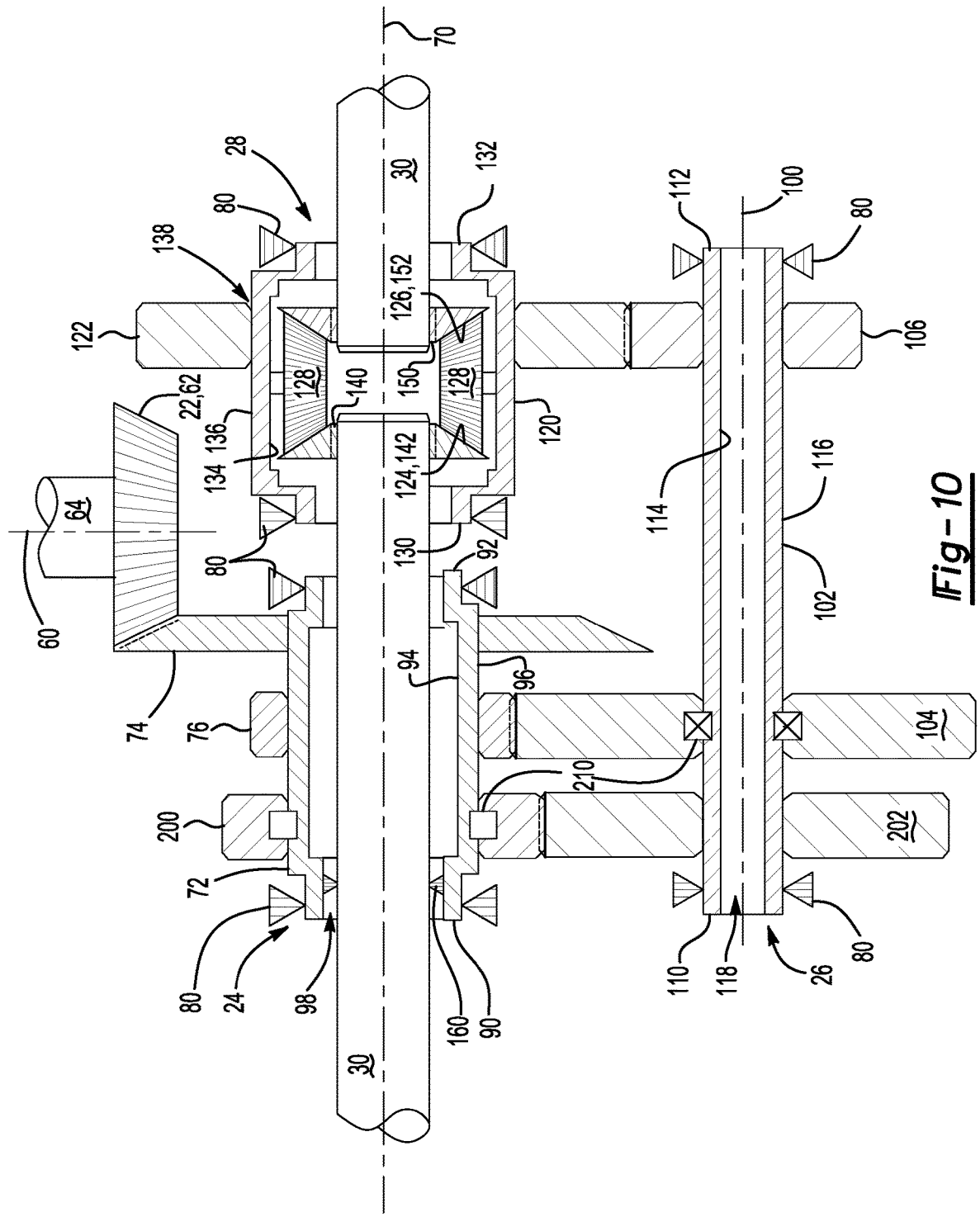
FIGS. 10 and 11 show examples of multi-speed configurations of an axle assembly.
Figure 11:
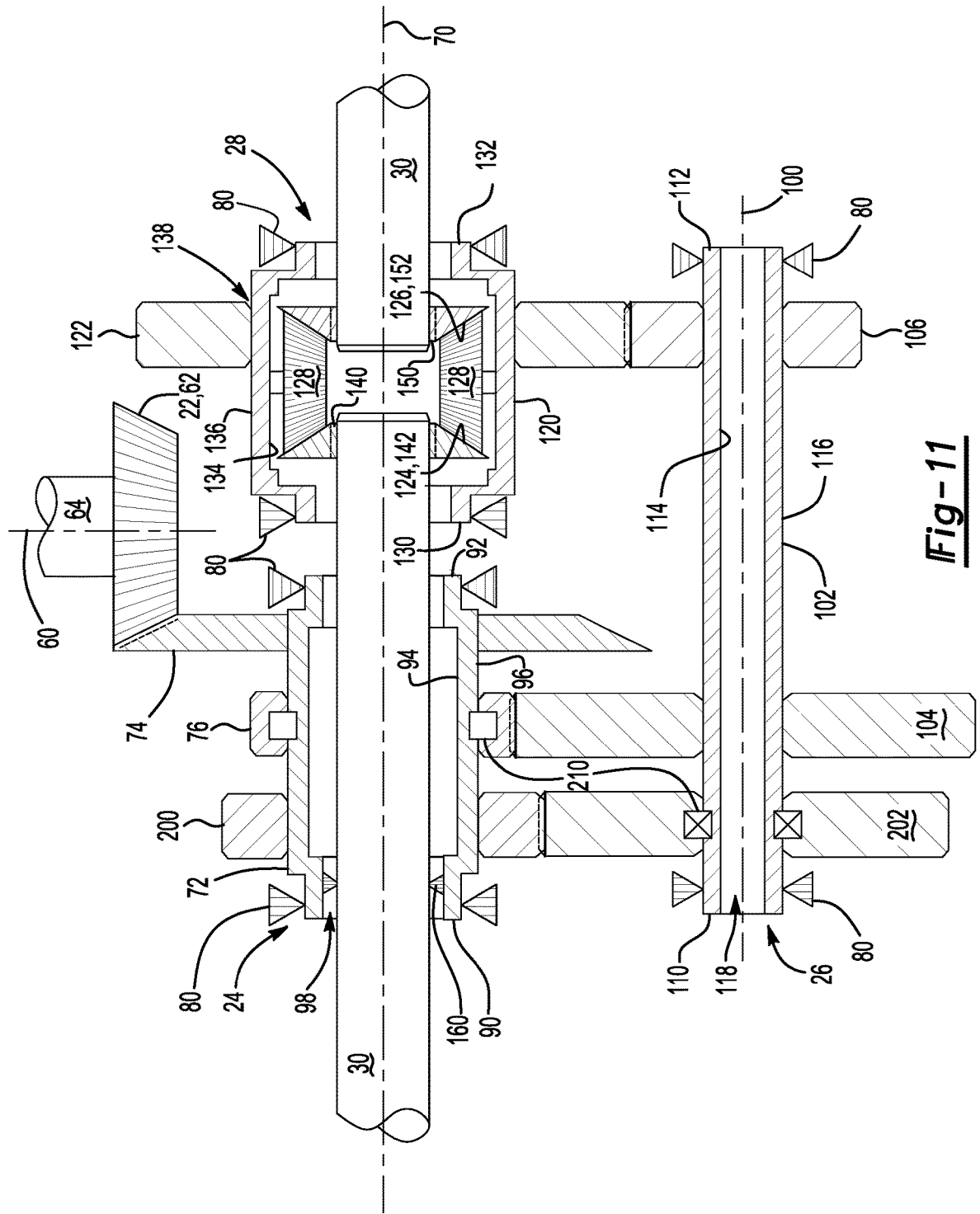

As another option, one clutch 210 may be configured to selectively couple different gears or multiple gears to the first shaft 72. For instance, one clutch may couple the first gear 76 to the first shaft 72 while allowing the first shaft 72 to rotate with respect to the fifth gear 200 when the clutch is in a first position and may couple the fifth gear 200 to the first shaft 72 while allowing the first shaft 72 to rotate with respect to the first gear 76 when the clutch is in a second position. It is also contemplated that such a clutch may be associated with the second shaft 102. An example of a clutch that selectively couples multiple gears is shown in FIGS. 8 and 9. The clutch 210 may be a double-acting clutch collar that may include a clutch hole 220, a clutch spline 222, a clutch groove 224, a first clutch gear 226, and a second clutch gear 228.

The clutch hole 220 may extend through the clutch 210 and may extend around a corresponding shaft, such as the first shaft 72 or the second shaft 102.

The clutch spline 222 may be disposed in the clutch hole 220. The clutch spline 222 may mate with a spline on a corresponding shaft, such as the first shaft 72 or the second shaft 102. The mating splines may allow the clutch 210 to move in an axial direction along a shaft while inhibiting rotation of the clutch 210 with respect to the shaft. Thus, the clutch 210 may be rotatable about an axis (e.g., the first axis 70 or the second axis 100) with the shaft.

The clutch groove 224 may face away from the clutch hole 220 and may be configured to receive a linkage 230, such as a shift fork, that may operatively connect the clutch 210 to an actuator 232.

The first clutch gear 226 may have teeth that may be configured to mate with corresponding teeth on a gear. For instance, the teeth of the first clutch gear 226 may mate and mesh with teeth 240 on the first gear 76 to couple the first gear 76 to the first shaft 72 so that the first gear 76 is rotatable with the first shaft 72 when the clutch 210 is in a first position as is shown in FIG. 8. The clutch 210 may not couple the fifth gear 200 to the first shaft 72 when the clutch 210 is in the first position. As such, the first shaft 72 may be free to rotate with respect to the fifth gear 200. Although the teeth of the first clutch gear 226 are depicted as being outside the first gear 76, it is contemplated the that teeth of the first clutch gear 226 and teeth 240 on the first gear 76 may be configured like a spline and may be received inside a hole in the first gear 76 between the first shaft 72 and the first gear 76 to selectively couple the first gear 76 to the first shaft 72.

The second clutch gear 228 may be disposed opposite the first clutch gear 226. The second clutch gear 228 may be omitted when a clutch is configured to selectively couple/decouple a single gear and a corresponding shaft. The second clutch gear 228 may be provided with a double-acting clutch that may selectively couple and decouple another gear to a corresponding shaft. For instance, the teeth of the second clutch gear 228 may mesh with teeth 242 on the fifth gear 200 so that the fifth gear 200 is rotatable with the first shaft 72 when the clutch 210 is in a second position as is shown in FIG. 9. The clutch 210 may not couple the first gear 76 to the first shaft 72 when the clutch 210 is in the second position. As such, the first shaft 72 may be free to rotate with respect to the first gear 76. Although the teeth of the second clutch gear 228 are depicted as being outside the fifth gear 200, it is contemplated the that teeth of the second clutch gear 228 and teeth 242 on the fifth gear 200 may be configured like a spline and may be received inside a hole in the fifth gear 200 between the first shaft 72 and the fifth gear 200 to selectively couple the fifth gear 200 to the first shaft 72.

The clutch 210 may also be movable to a third position or a neutral position that may be axially positioned between the first position and the second position. The clutch 210 may not couple gears to a shaft when the clutch 210 is in the third position. For instance, the clutch 210 may not couple the first gear 76 or the fifth gear 200 to the first shaft 72 when the clutch 210 is associated with the first shaft 72 and is disposed in the third position.

The actuator 232 may be configured to move the clutch 210. The actuator 232 may be of any suitable type. For example, the actuator 232 may be an electrical, electromechanical, pneumatic, or hydraulic actuator. In at least one configuration, such as when the clutch 210 is a clutch collar, the actuator 232 may move the clutch 210 along an axis and may execute a shift when the rotational speed of the clutch 210 and a corresponding gear are sufficiently synchronized to complete a shift so that the teeth of a clutch gear may mesh with teeth on a gear or so that the teeth of a clutch gear may disengage from teeth on a gear.

It is also contemplated that the double-acting clutch collar of FIGS. 8 and 9 may be provided with the second gear mechanism 26 in place of or in addition to providing such a clutch with the first gear mechanism 24. For example, a double-acting clutch collar that is provided with the second gear mechanism 26 may receive the second shaft 102 and selectively couple the second gear 104 and the sixth gear 202 to the second shaft 102.

Referring to FIGS. 6 and 7, another configuration is shown that is similar to the configuration shown in FIGS. 4 and 5, however, the clutch or clutches 210 are associated with the second gear mechanism 26 rather than the first gear mechanism 24. The first gear 76 and the fifth gear 200 may be fixedly disposed on the first shaft 72.

In FIG. 6, one or more clutches 210 may be provided to couple the second gear 104 to the second shaft 102 such that the second gear 104 is rotatable about the second axis 100 with the second shaft 102 while the sixth gear 202 is decoupled from the second shaft 102 such that the second shaft 102 is rotatable about the second axis 100 with respect to the sixth gear 202. As such, torque is transmitted from the first gear mechanism 24 to the second gear mechanism 26 via the first gear 76 and the second gear 104 rather than via the fifth gear 200 and the sixth gear 202.

In FIG. 7, one or more clutches 210 may be provided to couple the sixth gear 202 to the second shaft 102 such that the sixth gear 202 is rotatable about the second axis 100 with the second shaft 102 while the second gear 104 is decoupled from the second shaft 102 such that the second shaft 102 is rotatable about the second axis 100 with respect to the second gear 104. As such, torque is transmitted from the first gear mechanism 24 to the second gear mechanism 26 via the fifth gear 200 and the sixth gear 202 rather than via the first gear 76 and the second gear 104.

It is also further contemplated that clutches may be provided on different shafts for corresponding gear pairs. For instance, the second gear 104 and fifth gear 200 may be fixed to the second shaft 102 and first shaft 72, respectively, while a clutch 210 may be provided to selectively couple the first gear 76 to the first shaft 72 and another clutch may be provided to selectively couple the sixth gear 202 to the second shaft 102. As another example, the first gear 76 and sixth gear 202 may be fixed to the first shaft 72 and second shaft 102, respectively, while a clutch 210 may be provided to selectively couple the fifth gear 200 to the first shaft 72 and another clutch may be provided to selectively couple the second gear 104 to the second shaft 102. Furthermore, the planetary gear set 170 that is shown in FIG. 3 may also be provided with any of the multispeed axle assembly configurations described above, including but not limited to those shown in FIGS. 4-7.

The axle assembly configurations discussed above may help reduce the package space or size of an axle assembly by allowing a power source to be positioned closer to the axle shafts and center line of the axle assembly, which may help reduce material requirements and weight as compared to a "bolt-on" design in which a power source like an electric motor is mounted to an end of the axle housing or cantilevered from the axle housing. In addition, positioning a power source closer to the axle shafts may move the center of gravity closer to the axle shafts, which may help provide an axle assembly with better balance. Furthermore, the axle assembly configurations discussed above may help position the 90° gear interface between the drive pinion and the ring gear closer to the power source or in a location where the input torque is reduced, which may allow the size of the associated interfacing gears to be reduced and may help improve the life of the roller bearing assemblies that rotatably support the drive pinion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a drive pinion that is rotatable about a drive pinion axis;
    a first gear mechanism that includes a first shaft, a ring gear, a first gear, and a fifth gear that are rotatable about a first axis, wherein the ring gear meshes with the drive pinion;
    a second gear mechanism having a second gear, a third gear, and a sixth gear that are rotatable about a second axis, wherein the first gear meshes with the second gear and the fifth gear meshes with the sixth gear; and
    a differential assembly that includes a differential case that receives pinion gears that mesh with first and second differential gears that are mounted to first and second axle shafts, respectively, and a fourth gear that are rotatable about the first axis, wherein the third gear meshes with the fourth gear, torque is transmitted between the first gear mechanism and the second gear mechanism via either the first gear and the second gear or the fifth gear and the sixth gear, the fourth gear encircles the differential case and the pinion gears of the differential assembly, and the ring gear encircles the first shaft but does not encircle the differential assembly.

2. The axle assembly of claim 1 wherein the ring gear is fixedly mounted to the first shaft, and the first gear and the fifth gear are selectively coupled to the first shaft.

3. The axle assembly of claim 2 wherein a clutch selectively couples the first gear and the fifth gear to the first shaft.

4. The axle assembly of claim 1 wherein the second gear mechanism includes a second shaft that is rotatable about the second axis, wherein the second gear and the sixth gear are selectively coupled to the second shaft.

5. The axle assembly of claim 4 wherein a clutch selectively couples the second gear and the sixth gear to the second shaft.

6. The axle assembly of claim 1 wherein the second gear mechanism includes a second shaft that is rotatable about the second axis, and at least one of the first gear and the fifth gear are selectively couplable to the first shaft and at least one of the second gear and the sixth gear are selectively couplable to the second shaft.

7. The axle assembly of claim 1 wherein the first gear has a smaller diameter than the fifth gear.

8. The axle assembly of claim 7 wherein the second gear has a larger diameter than the fifth gear and the sixth gear.

9. The axle assembly of claim 1 wherein the second gear mechanism has
    second shaft that is rotatably supported by a bearing assembly that has an inner race that is mounted to the second shaft.

10. The axle assembly of claim 1 wherein the drive pinion provides torque to the ring gear.

11. The axle assembly of claim 1 wherein the drive pinion extends from an electric motor.

12. The axle assembly of claim 1 wherein the drive pinion extends from a planetary gear set.

13. The axle assembly of claim 1 wherein the first axis is disposed parallel to the second axis.

14. The axle assembly of claim 1 wherein the first gear mechanism is spaced apart from the differential assembly and the first gear mechanism and differential assembly are rotatable about the first axis at different speeds.

15. The axle assembly of claim 1 wherein the ring gear and the first gear are fixedly mounted to the first shaft.

16. The axle assembly of claim 1 further comprising an axle shaft that extends from the differential assembly, wherein the axle shaft is rotatable about the first axis and extends through the first shaft.

17. The axle assembly of claim 1 wherein the fourth gear is fixedly mounted to the differential case.

18. The axle assembly of claim 1 wherein the first gear has a smaller diameter than the second gear.

19. The axle assembly of claim 1 wherein the third gear has a smaller diameter than the fourth gear and the first gear has a larger diameter than the third gear.

20. The axle assembly of claim 1
   the drive pinion axis is positioned between the first gear mechanism and the differential assembly.

\* \* \* \* \*